United States Patent [19]

Fraleux

[11] 4,395,736
[45] Jul. 26, 1983

[54] SOLID STATE IMAGE PICKUP
[75] Inventor: Jean Fraleux, Paris, France
[73] Assignee: Thomson - CSF, Paris, France
[21] Appl. No.: 284,500
[22] Filed: Jul. 17, 1981
[30] Foreign Application Priority Data Jul. 25, 1980 [FR] France .............................. 80 16493

[51] Int. Cl.³ ............................................ H04N 3/14
[52] U.S. Cl. ............................. 358/213; 250/211 R;
250/213 R; 357/30; 357/32; 357/45
[58] Field of Search ................. 358/212, 213; 357/30,
357/32, 45; 250/211 R, 211 J, 213 R

[56] References Cited
U.S. PATENT DOCUMENTS 4,209,806 6/1980 Koike et al. ......................... 358/213
4,291,337 9/1981 Takemura et al. .................. 358/213

FOREIGN PATENT DOCUMENTS 2030026 3/1980 United Kingdom .

OTHER PUBLICATIONS

International Conference On Charge Coupled Devices, Conference 3, The Technology and Applications of Charge Coupled Devices, University of Edinburgh, Hsin Fu Tseng et al, "Optimization of a Solid State Image Sensor", pp. 75-84.
RCA Review, vol. 32, No. 2, Jun. 1971, New York, P. K. Weimer, "Systems and Technologies for Solid—State Image Sensors", pp. 251-262.

Primary Examiner—Robert L. Richardson
Attorney, Agent, or Firm—Roland Plottel

[57] ABSTRACT

A Detection Matrix having elementary modules disposed in lines and in columns. Each module has a photoconductance, a thin-film MOS transistor and a storage capacitor. The gate of the transistor is connected to a line electrode. The source of the transistor is connected to a video amplifier, and the drain of the transistor is connected to one terminal of the photocapacitance and of the capacitor. The other terminal of the photoconductance of the capacitor are both connected to the line electrode following or preceding the line electrode connected to the gate of the transistor.

8 Claims, 2 Drawing Figures

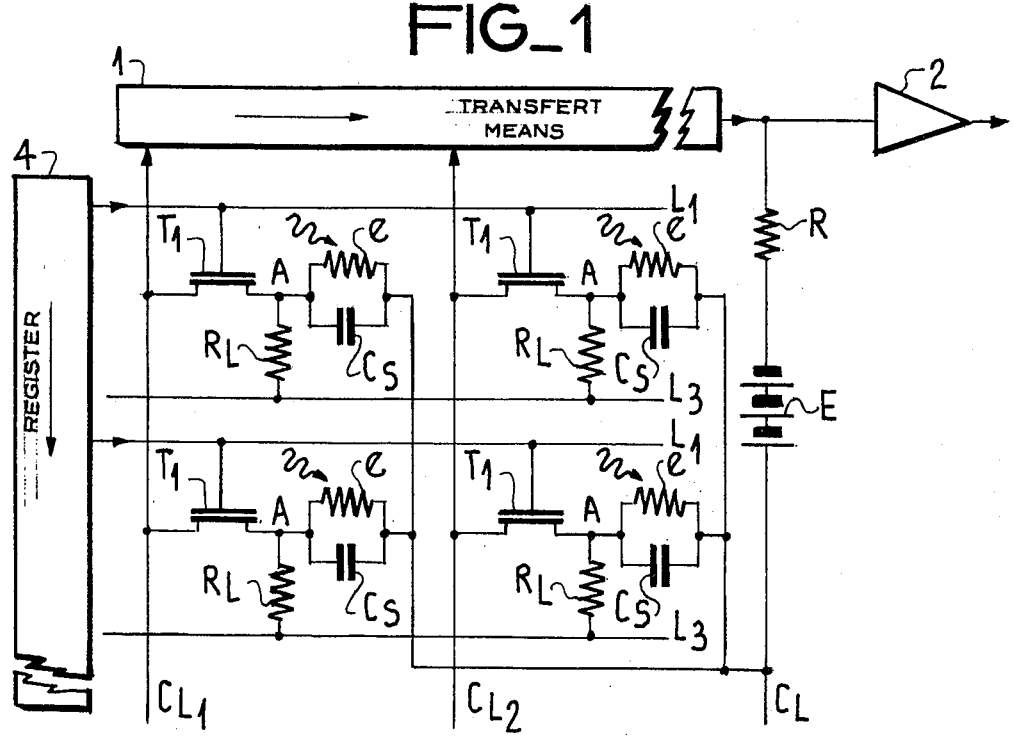
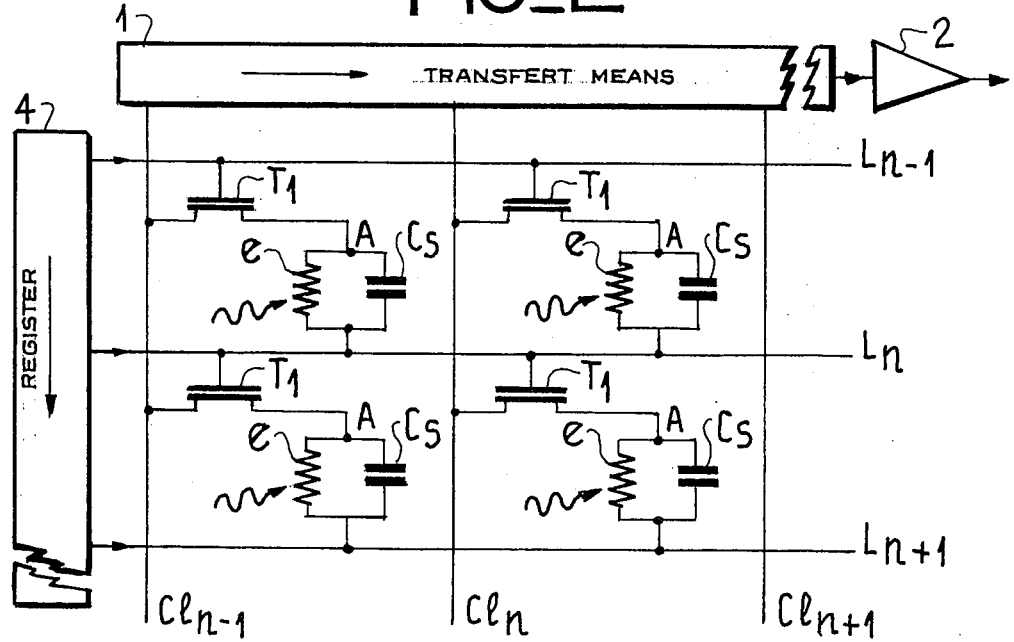

SOLID STATE IMAGE PICKUP

BACKGROUND OF THE INVENTION

The present invention relates to an electromagnetic radiation detection matrix comprising thin-film transistors.

It also relates to radiological image intensifiers comprising such a matrix.

Thin-film transistor electromagnetic radiation detection matrices are generally formed from photosensitive elements, photodiodes or photoconductances, formed with thin-film techniques on the same dielectric substrate and disposed at each crossing point of lines and perpendicular columns.

Means for addressing each line of photosensitive elements are formed by an MOS transistor, formed by thin-film technology and associated with each photosensitive element. Each addressing transistor receives periodically at its gate a turn-on pulse applied simultaneously to all the addressing transistors in the same line of photosensitive elements, and is connected to means for transferring to a video amplifier electric signals supplied by each line of elements addressed.

Finally, means for amplifying the electric signal supplied by each photosensitive element are associated with each of these elements and formed in accordance with thin-film technology.

The name of elementary module is given to the assembly formed of a photosensitive element with which are associated addressing and amplification means and different elements such as a resistor or a capacitor.

Such detection matrices comprise a number of intersections between connection lines. These intersections form a considerable limitation as regards the efficiency in manufacturing these devices.

In fact each intersection forms a fragile point in the implantation of such matrices. There may occur interruption of the electric continuity for the connecting part which crosses the step of insulating material intended to separate electrically the lower and upper connections. There may also occur a short-circuit between the upper and lower connections.

Depending on the type of connection and the organization of the lines and columns, these defects may saturate a line and a column or, on the contrary, disable them.

A reduction in the number of intersections between electrodes would then provide a solution for the problems raised; this is what the present invention proposes doing in the case where the photosensitive elements are formed by photoconductances.

The invention allows the number of intersections per elementary module to be reduced by half. It increases in addition the useful detection surface.

SUMMARY OF THE INVENTION

The present invention provides a matrix for detecting an electromagnetic radiation comprising, in a network of line and column electrodes, addressing means formed by MOS transistors (T1) formed in accordance with thin-film technology, photosensitive elements formed by photoconductances (e), means for amplifying the electric signals supplied by each photosensitive element, means (1) for transferring to a video amplifier (2) the electric signals supplied by each line of elements addressed, each MOS transistor receiving periodically at its gate a turn-on pulse applied simultaneously to all the addressing transistors of the same line, one of its terminals being connected to the transfer means and the other to a terminal of the associated photoconductance, which matrix is characterized in that it further comprises means for applying permanently a fixed potential to all the lines and in that the other terminal of said photoconductance is connected to the line electrode opposite that one controlling the gate of the addressing transistors.

DESCRIPTION OF THE FIGURES

Other objects, characteristics and results of the invention will become clear from the following description illustrated by the accompanying figures which represent:

FIG. 1: one example of an electromagnetic radiation detection matrix used in the prior art;

FIG. 2: an electromagnetic radiation detection matrix in accordance with the invention.

In the different figures, the same references designate the same elements but, for the sake of clarity, the sizes and proportions of the different elements have not been respected.

DESCRIPTION OF THE PREFERRED EMBODIMENT

FIG. 1 shows an electromagnetic radiation detection matrix used in the prior art.

For the sake of simplicity, only four elementary modules have been shown.

The electromagnetic radiation detection matrix shown in FIG. 1 comprises a photosensitive element e at each point where lines and perpendicular columns intersect each other. These photosensitive elements are formed in accordance with thin-film technology by evaporation on the same dielectric substrate.

In this example it is a question of photoconductances. The photosensitive elements may also be formed by photodiodes.

Means for addressing a line of photosensitive elements at one and the same time are provided. These means are formed by MOS transistors made from cadmium selenide CdSe for example, formed in accordance with thin-film technology, T1, which are associated with each photosensitive element e. Each transistor T1 receives periodically at its gate a turn-on pulse $L_1$ which is applied simultaneously to all the addressing transistors in the same line. The turn-on pulse $L_1$ is obtained, in a way known per se, by means of a register 4 which conveys a turn-on pulse or by means of a multiplexer.

The addressing transistors $T_1$ relative to the same column of photosensitive elements are connected by the same column $Cl_1$, $Cl_2$, $Cl_n$ to transfer means 1 connected to a video amplifier 2.

Each line of photosensitive elements addressed, i.e. each line of photosensitive elements whose addressing transistors T1 are made conducting, then feeds electric signals representative of the radiation received by each photosensitive element, in parallel, to the transfer means 1 connected to the video amplifier 2. The elementary modules are connected between one of the columns $Cl_1$, $Cl_2 \ldots Cl_n$ and a common column $C_L$ connected to the common point between the transfer means 1 and the video amplifier 2: this column $C_L$ comprises a voltage source E in series with a resistor R.

Finally, a resistor $R_L$ is connected between point A and a reference potential $L_3$, conveyed by a horizontal line to all the resistors in the same line.

For a given potential $L_3$, the value of resistor $R_L$ is adjusted from one photoconductance to the other so that the same darkness current flows in the photoconductances when they are not receiving any radiation.

The turning on of $T_1$ by the control pulse $L_1$ causes a reading current to flow in each column $Cl_1, Cl_2 \ldots Cl_n$ whose value depends on the charge across $C_s$ and so on the radiation received by the photoconductance e.

The reference potential $L_3$ is generally formed by the positive terminal of the voltage source E. The provision of line $L_3$ which connects the resistors $R_L$ to the positive terminal of E may be avoided. For that, it is sufficient to use as reference potential the voltage conveyed by line $L_1$ of the next elementary module line.

It is then possible to use only a single horizontal line conveying the voltages or control signals to all the elementary modules in the same line of photosensitive elements.

FIG. 2 shows an electromagnetic radiation detection matrix in accordance with the invention.

The detection matrix in accordance with the invention is formed by a network of line electrodes $L_n$ and column electrodes $Cl_n$ defining elementary modules.

Only four elementary modules have been shown in the figure.

An elementary module is formed by an MOS addressing transistor $T_1$, a photoconductance e in parallel across a storage capacitor $C_s$. These elements are the same as those described in FIG. 1; this is why it has not been thought necessary to give details of the operation thereof. The arrangement of the elementary module of the invention is remarkable by the fact that the photoconductance e is connected between point A, the drain of the addressing transistor $T_1$, and the line electrode $L_n$ opposite the one $L_{n-1}$ controlling the gate of the transistor $T_1$.

It is assumed in the operation that a faultless photoconducting layer may be obtained by improving the present technology. The lower line $L_n$ may therefore be used as potential reference for the detection circuit.

This reference value is only disturbed line by line, once per frame. At the moment when a turn-on pulse is applied to a line of modules, all the transistors in this line are made conducting, without the potential of the line underneath being disturbed thereby.

Similarly, this potential pulse does not disturb the operation of the upper line whose transistors are turned off.

With respect to the operation of the detection matrix described in FIG. 1, the biasing direction of the addressing transistors is no longer free.

In the first case the column could be either positive or negative. In the case of the invention, the column must be positive. If this were not the case, the reference line of each of the transistors of the matrix, which is positive, would maintain them all in the conducting state, for the duration of the frame. This arrangement has the advantage of doing away with the network of reference columns $C_L$ and so in reducing by half the number of intersections between electrodes, per elementary module. This new implantation presents the incontestable advantage of increasing the efficiency of manufacture of the system.

In fact, the intersections between electrodes represent fragile points in the device and may give rise to all sorts of imperfections hindering the operation of the system. A reduction by half of the number of these intersections brings then a promise of a considerable increase in the manufacturing efficiency.

Because of the improvement provided by the invention, a greater fraction of the surface of a detection point may be devoted to the sensitive area.

This gain may be estimated by adopting, by way of nonlimiting example, the following geometric characteristics for an elementary module:

dimension of a detection point (400 $\mu$m)$^2$
dimension of a transistor (100 $\mu$m)$^2$
width of a line 40 $\mu$m
space between lines 40 $\mu$m.

The effective detection surface for an elementary module of the prior art is about $4.1 \times 10^4$ $\mu$m$^2$.

The effective detection surface for an elementary module in accordance with the invention is about $6.8 \times 10^4$ $\mu$m$^2$.

The absolute gain is then $2.7 \times 10^4$ $\mu$m$^2$, the relative gain 66%, which clearly shows the great advantage of the improvement brought by the invention.

The detection matrix of the invention is used in radiological image intensifiers or it provides either the conversion of incident X photons into an electric reading signal, or only the detection of a visible radiation in the case where the incident X photons are converted into photons of lower energy by a scintillator.

The scintillator is then formed by a panel placed in contact with the detecting mosaic.

What is claimed is:

1. A matrix for detecting electromagnetic radiation comprising a network of line and column electrodes, and interconnected therewith at intersections thereof cells, each cell comprising a MOS transistor having a gate and two other terminals, a two-terminal photo-sensitive photoconductance, and means for amplifying the electric signals supplied by each photo-sensitive element; means adapted for transferring to a video amplifier the electric signals supplied by each line of elements addressed; each MOS transistor adapted for receiving periodically at its gate a turn on pulse, applied simultaneously to all the MOS transistors in the same line; one of the other terminals at each MOS transistor being connected to the transfer means, and the other to one terminal of the photoconductance in the cell; means for applying a potential to all the lines; and said other terminal of said photoconductance being connected to the line electrode adjacent to the one controlling the gate of the MOS transistor in its cell.

2. The detection matrix as claimed in claim 1, wherein the MOS transistors $T_1$ are made conducting by positive pulses and these pulses are conveyed over the same line for each line of cells.

3. The detection matrix as claimed in claim 1, wherein the amplification means comprise a storage capacitor connected in parallel across each photoconductance.

4. A matrix for detecting electromagnetic radiation comprising a network of line and column electrodes; unit cells interconnected with said network, each cell being associated with a crossover of a line and column electrode; each cell comprising a 3-terminal transistor having a control terminal and two flow terminals, and a two-terminal photosensitive element; said control terminals in several cells being connected to the associated line electrode of said network; one terminal of said photosensitive element of said several cells being connected to an adjacent line electrode of said network, with adjacent line is connected to the control terminals of several other cells; the other terminal of said photosensitive element in each cell being connected to one of said flow terminals of the transistor in its cell, and the other flow terminal of said transistor being connected to the associated column electrode.

5. A matrix according to claim 4 wherein said photosensitive element is a photoconductive element, and further comprising means for amplifying the signal from said photoconductive element connected in parallel across said element.

6. A matrix according to claim 5 wherein said amplification mean comprises a storage capacitor connected in parallel across said photoconductance.

7. A matrix according to claim 5 wherein said transistor is an MOS transistor.

8. Detection matrix comprising a plurality of elementary modules disposed in lines and columns; a plurality of line and column electrodes; each module comprising a photoconductance, an MOS transistor, and a storage capacitor, with each transistor having a gate connected to a line electrode, a source adapted to be connected to a video amplifier, and a drain connected to one terminal of the photoconductor and to one terminal of the capacitor; the other terminal of the photoconductor and the capacitor being connected to the line electrode following or preceding said line electrode connected to the gate of the transistor.

* * * * *